US007216580B2

(12) United States Patent
Miyamoto et al.

(10) Patent No.: US 7,216,580 B2
(45) Date of Patent: May 15, 2007

(54) MULTISTAGE STROKE CYLINDER APPARATUS

(75) Inventors: Michikazu Miyamoto, Tsukuba-gun (JP); Nobuo Harihara, Tsukuba-gun (JP); Takayuki Sawada, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 948 days.

(21) Appl. No.: 10/061,150

(22) Filed: Feb. 4, 2002

(65) Prior Publication Data

US 2005/0257683 A1 Nov. 24, 2005

(30) Foreign Application Priority Data

Feb. 20, 2001 (JP) ............................ 2001-043839

(51) Int. Cl.
*F16D 31/02* (2006.01)

(52) U.S. Cl. ...................................................... 92/13.1

(58) Field of Classification Search .................. 92/13.1
See application file for complete search history.

(56) References Cited

U.S. PATENT DOCUMENTS

| | | | | |
|---|---|---|---|---|
| 2,005,387 | A * | 6/1935 | Pelton | 92/62 |
| 2,915,043 | A * | 12/1959 | Neiner | 92/12 |
| 4,186,649 | A * | 2/1980 | Sundstrom | 92/13.2 |
| 5,957,028 | A * | 9/1999 | Tischer et al. | 92/13.1 |
| 6,651,546 | B2 * | 11/2003 | Sandlin | 92/13.1 |

* cited by examiner

*Primary Examiner*—F. Daniel Lopez
(74) *Attorney, Agent, or Firm*—Oblon, Spivak, McClelland, Maier & Neustadt, P.C.

(57) ABSTRACT

A multistage stroke cylinder apparatus includes a main cylinder having a main piston and a main rod, an intermediate stop position setting mechanism for setting an intermediate stop position of the main piston, and a return position setting mechanism for setting a return position of the main piston. The intermediate stop position setting mechanism includes a stop position setting piston for coming in contact with the main piston, an auxiliary rod extending from the setting piston, a stopper mounted to a tip end of the auxiliary rod such that a mounting position of the stopper can be changed, and a contact portion a position of which can be changed by a contact position adjusting piston. The return position setting mechanism includes a return position setting piston and a position setting rod connected to the return position setting piston and having a tip end projecting behind the stop position setting piston.

10 Claims, 7 Drawing Sheets

MULTISTAGE STROKE CYLINDER APPARATUS

TECHNICAL FIELD

The present invention relates to a multistage stroke cylinder apparatus suitable for use in which a stroke of a cylinder needs to be adjusted in a plurality of stages like in a gun cylinder or the like in a spot welding device.

PRIOR ART

A movable-side electrode in a spot welding device needs to have at least two stages of stop positions with respect to a fixed-side electrode. In other words, in a gun cylinder, it is necessary to occupy a fully open position where the electrodes of a pair are open when an object to be welded is sandwiched between the electrodes, a welding preparatory position where the electrodes of the pair are caused to face the object to be welded positioned between the electrodes through relatively short working strokes so as to minimize a length of the stroke to carry out a plurality of times of spot welding, and a welding operating position where both the electrodes are pressed against the object.

In welding operation under present circumstances, it is also required to increase a degree of freedom of a welding stroke to be adaptable to many kinds of members to be welded and a demand for an electric (servo) welding gun for achieving it is growing. However, the electric (servo) welding gun under present circumstances has a price problem, problems of deposition accidents in line operations, and problems in terms of practicality such as difficulty in handling.

The above-described problems are found not only in the spot welding gun cylinder but also in a device such as a pressurizing unit of various clamping devices in which a head mounted to a tip end of a main rod is repeatedly pushed against a workpiece. In this case, there are similar problems.

DISCLOSURE OF THE INVENTION

An object to be achieved by the present invention is basically to provide a simple mechanism for solving the above problems to a prior-art fluid pressure cylinder for a spot welding gun or the like.

It is a further concrete object of the invention to provide a multistage stroke cylinder apparatus which has at least two stages of stop positions with respect to an object and in which a freedom of a stroke is increased so as to be adaptable to many kinds of members to be welded.

It is another object of the invention to provide a multistage stroke cylinder apparatus less expensive and with better operability than an electric (servo) welding gun.

It is another object of the invention to provide a multistage stroke cylinder apparatus having a cushioning mechanism to be adaptable to reduction of wear of a welding rod and other tools and diminishing of a collision sound.

It is another object of the invention to provide a multistage stroke cylinder in which each stroke can be adjusted by remote operation which is supply and discharge of fluid by a solenoid valve.

It is another object of the invention to provide a multistage stroke cylinder apparatus in which an operating form of the main rod operating in a complicated manner can be detected.

To achieve the above objects, according to the invention, there is provided a multistage stroke cylinder apparatus comprising: a main cylinder including a main piston housed for sliding in a cylinder tube and driven by fluid pressure supplied to pressure chambers on opposite sides of the main piston and a main rod connected to the main piston, a head cover and a rod cover being mounted to opposite ends of the cylinder tube; an intermediate stop position setting mechanism for setting an intermediate stop position of the main piston; and a return position setting mechanism for setting a return position of the main piston, wherein the intermediate stop position setting mechanism includes a stop position setting piston disposed for sliding between the main piston in the cylinder tube and the head cover to define the intermediate stop position of the main piston by coming in contact with the main piston, an auxiliary rod connected to the stop position setting piston and having a tip end passing through the head cover and extending outside, a stopper fitted with the tip end of the auxiliary rod to stop the stop position setting piston in a necessary position by coming in contact with a contact portion of the head cover, and a changing mechanism for changing a stop position of the stop position setting piston by the stopper and the return position setting mechanism includes a return position setting piston provided for sliding to the head cover and a position setting rod connected to the return position setting piston and having a tip end projecting behind the stop position setting piston.

In a concrete example of the invention, the changing mechanism has at least one of a mechanism for changing a mounting position of the stopper on the auxiliary rod and a mechanism for changing a position of the contact portion by a contact position adjusting piston.

To put it more concretely, the mechanism for changing the mounting position of the stopper has a plurality of stepped portions formed on opposite sides of an inner hole of the stopper and having different depths and a stepped portion formed on an outer periphery of the auxiliary rod and is formed to be able to change the mounting position of the stopper on the auxiliary rod by changing an orientation of the stopper to selectively bring any of the stepped portions into-contact with the stepped portion of the auxiliary rod. The mechanism for changing the position of the contact portion has the contact position adjusting piston having the contact portion and the adjusting piston is mounted to the head cover and driven by fluid pressure in such directions as to approach and move away from the stopper.

According to another concrete embodiment of the invention, the auxiliary rod passes for sliding through the return position setting piston and the position setting rod and projects outside the head cover and has a flow path connecting a port for supplying pressure fluid and the pressure chamber on one side of the main piston in the auxiliary rod.

In the multistage stroke cylinder apparatus of the invention, the main cylinder may have a cushioning mechanism for reducing a speed of the main piston by restricting a discharge flow rate of fluid discharged from a discharge-side pressure chamber at an end of a stroke of the main piston.

It is also possible that the main cylinder has a stroke detector for outputting an electric signal according to a stroke position of the main rod and that the stroke detector is connected to a detection controller for detecting an operating form of the main rod based on the output.

Furthermore, it is possible to attach a balance mechanism to the cylinder apparatus, the balance mechanism being for causing the stop position setting piston to stop in a position where the stop position setting piston has moved toward the main piston when pressure fluid at the same pressure is supplied to pressure chambers on opposite sides of the stop position setting piston in order to eliminate necessity of consideration of a degree of fluid pressure supplied to each the pressure chamber in connection with a difference between the pressure receiving areas on opposite sides of the stop position setting piston.

In the multistage stroke cylinder apparatus having the above structure, the main rod is driven in an axial direction by driving by fluid pressure of the main piston. In order to set the intermediate stop position of the main piston, the stop position setting piston with which the main piston comes in contact and stops is provided, the auxiliary rod extending from the piston extends outside from the head cover, and the stopper is mounted to the tip end of the auxiliary rod. Therefore, by bringing the stopper into contact with the contact portion of the head cover to position the stop position setting piston, the stop position of the main piston can be set. Furthermore, because the stop position of the stop position setting piston defined by the stopper can be changed, the intermediate stop position of the main rod can be adjusted.

As the return position setting mechanism for setting the return position of the main piston, the tip end of the position setting rod connected to the return position setting piston is caused to face a back of the stop position setting piston to set the return position of the main piston. Therefore, by driving or non-driving of the return position setting piston, the return position of the main piston can be adjusted in two positions, i.e., the full stroke of the main cylinder can be adjusted in two stages.

As a result, according to the invention, it is possible to obtain the multistage stroke cylinder apparatus which has at least two stages of stop positions with respect to the object and in which the degree of freedom of the stroke is increased so as to be adjustable to many kinds of members to be welded.

DETAILED DESCRIPTION

Figure 1:
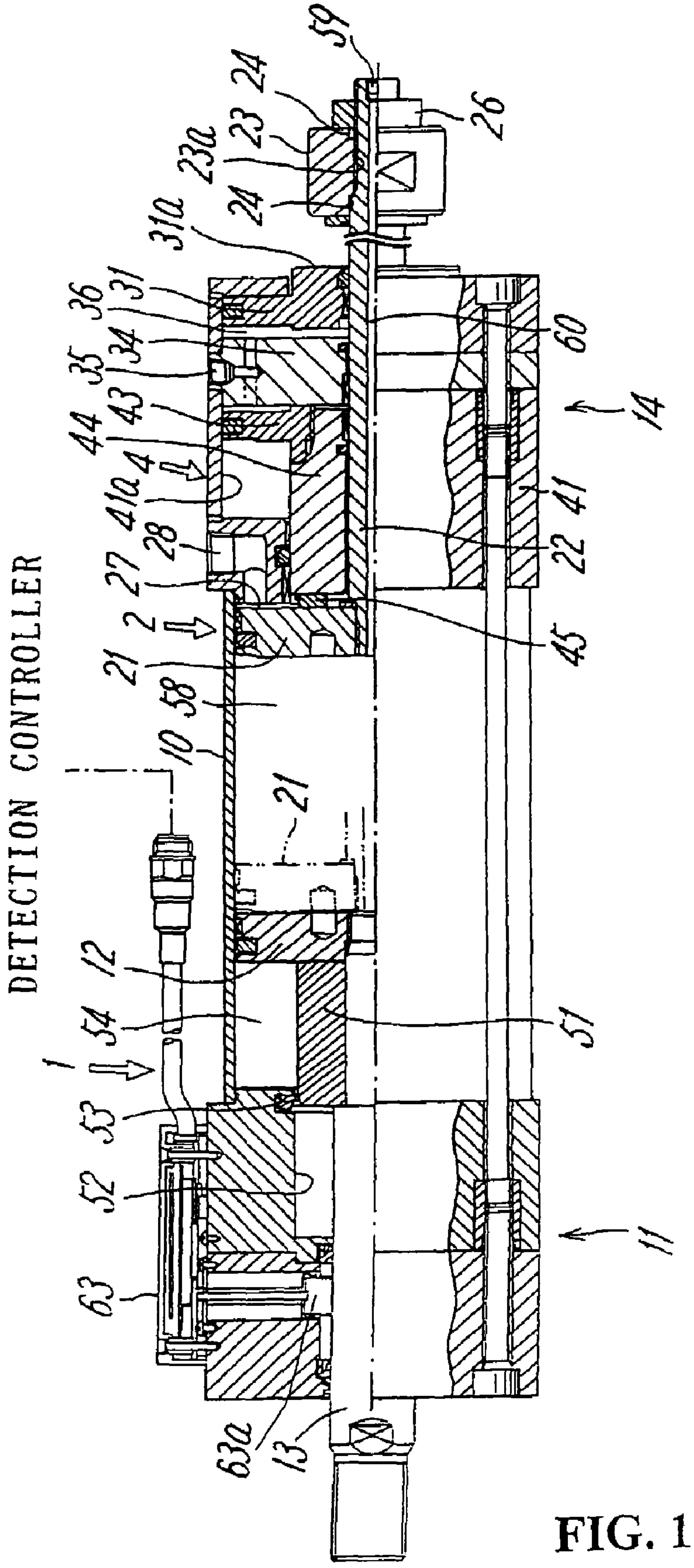
FIG. 1 is a partial sectional view of an entire structure of a first embodiment of a cylinder apparatus according to the present invention.

FIGS. 1 to 4 show a first embodiment of multistage stroke cylinder apparatus according to the present invention. The cylinder apparatus is a cylinder apparatus driven by pressure of fluid such as air and suitable for use in a case in which a plurality of stages of strokes and adjustable strokes are required like in a gun cylinder for spot welding. The cylinder apparatus includes a main cylinder 1 (see FIGS. 1 and 2) having a main piston 12 for sliding in a sealed state in a cylinder tube 10 and a main rod 13 passing through a rod cover 11 of the cylinder tube 10 and driven in an axial direction. To the main cylinder 1, an intermediate stop position setting mechanism 2 for setting an intermediate stop position of the main piston 12 and a return position setting mechanism 4 for setting a return position of the main piston 12 are attached.

The intermediate stop position setting mechanism 2 has a stop position setting piston 21 housed for sliding in a sealed state in a position facing the main piston 12 in the cylinder tube 10 and an auxiliary rod 22 connected to the piston 21. The auxiliary rod 22 extends through a head cover 14 of the cylinder tube 10 to an outside and a stopper 23 is mounted to a tip end of the auxiliary rod 22. The stopper 23 comes in contact with a contact portion 31*a* of a contact position adjusting piston 31. By this contact, a stop position of the stop position setting piston 21, i.e., the intermediate stop position of the main pist on 12 is set.

Figure 3:
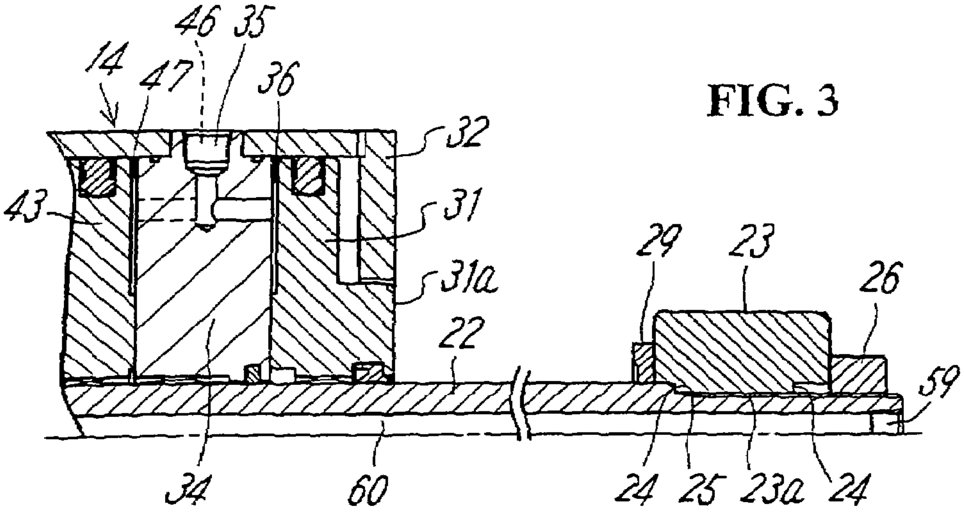
FIG. 3 is a vertical sectional view of an essential portion (intermediate stop position setting means) in the first embodiment.

As clearly shown in FIG. 3, the stopper 23 is fixed by a nut 26 screwed over the auxiliary rod 22 in a state in which the auxiliary rod 22 is inserted into a hole 23*a* at a center of the stopper 23 and stepped portions 24 formed at end portions of the hole 23*a* are brought into contact with a stepped portion 25 formed on a peripheral face of the auxiliary rod 22. In the drawing, a reference numeral 29 designates a damper.

The stepped portions 24 are formed respectively on opposite sides of the hole 23*a* and are at different distances from hole ends, i.e., have different depths. By detaching the nut 26 and reversing the stopper 23 in a longitudinal direction, a mounting position of the stopper 23 on the auxiliary rod 22 can be changed and, as a result, a contact stroke of the stopper 23 with respect to the contact position adjusting piston 31, i.e., a stroke of the stop position setting piston 21 can be changed. FIGS. 1 and 3 show states in which orientations of the stopper 23 are reverse to each other and the piston 21 has different strokes from each other. Therefore, the stepped portions 24, 24 formed on opposite sides of the hole 23*a* of the stopper 23 and having different depths form a changing mechanism for changing the stop position of the stop position setting piston 21 together with the stepped portion 25 of the auxiliary rod 22.

It is also possible to prepare a plurality of stoppers 23 having the stepped portions 24 with different depths and to variously change the stroke of the stop position setting piston 21 by exchanging the stoppers 23.

The contact position adjusting piston 31 is housed for sliding with a small stroke in a cylinder-shaped cover 32 provided on an outer end side of the head cover 14 and the contact portion 31*a* on an outer end face of the contact position adjusting piston 31 is exposed outside from the cylinder-shaped cover 32 and faces the stopper 23. The auxiliary rod 22 passes through a central hole of the piston 31 and the piston 31 can slide in a sealed state along and with respect to the auxiliary rod 22.

The contact position adjusting piston 31 is driven by pressure fluid (compressed air) supplied from a port 35 provided to a supply/discharge block 34 of the head cover 14 to a pressure chamber 36 to displace the contact portion 31*a* between two positions, i.e., a projecting position and a return position to thereby change a stop position of the stopper 23. Therefore, the contact position adjusting piston 31 also forms a changing mechanism for changing the stop position of the stop position setting piston 21. As a result, by combining a position change of the contact portion 31*a* by the contact position adjusting piston 31 and a position change of the stopper 23 on the auxiliary rod 22 by selection of the stepped portions 24, 24, it is possible to adjust the stop position of the stop position setting piston 21 in multiple stages. Especially, because position adjustment by the contact position adjusting piston 31 is carried out by supplying the pressure fluid from the port 35, it is possible to carry out the position adjustment by remote operation of a valve.

Although adjustment of the stop position of the stop position setting piston 21 may be carried out by both means of changing a fixed position of the stopper 23 on the auxiliary rod 22 and means of changing the position of the contact portion 31*a* by the contact position adjusting piston 31, it is also possible to carry out the adjustment by only one of the means. If the position of the contact portion 31*a* is not changed, the contact portion 31*a* can be directly mounted to the outer end face of the head cover 14.

The stop position setting piston 21 is driven by supplying and discharging pressure fluid (compressed air) from and to a port 28 provided to a main body 41 in the head cover 14 to and from a pressure chamber 27 behind the piston 21. In other words, the stop position setting piston 21 is moved to a predetermined intermediate stop position determined by the stopper 23 by supplying the pressure fluid from the port 28 to the pressure chamber 27 and the piston 21 is returned when the piston 21 is pressed by the returning main piston 12 in a state in which the pressure fluid is discharged through the port 28.

The return position setting mechanism 4 for setting the return position of the main piston 12 is formed by disposing a return position setting piston 43 for sliding in a sealed state in a cylinder portion 41*a* provided in the main body 41 and causing a position setting rod 44 connected to the piston 43 to face a back of the stop position setting piston 21 through a damper 45. The position setting rod 44 is fitted in a sealed state over an outer periphery of the auxiliary rod 22 of the stop position setting piston 21 and slides on the auxiliary rod 22. Between the return position setting piston 43 and the supply/discharge block 34 in the head cover 14, a driving-side pressure chamber 47 is formed. By supplying the pressure fluid such as compressed air to the pressure chamber 47 through a port 46 (in a different position from the port 35) for setting the return position, the piston 43 is driven and the position setting rod 44 occupies two positions, i.e., a projecting position for shortening an entire stroke of the main piston 12 and a return position for maximizing the stroke.

The cylinder apparatus includes a cushioning mechanism for reducing a speed of the main piston 12 at an end of the projecting stroke by restricting a discharge flow rate from a discharge-side pressure chamber 54.

Figure 2:
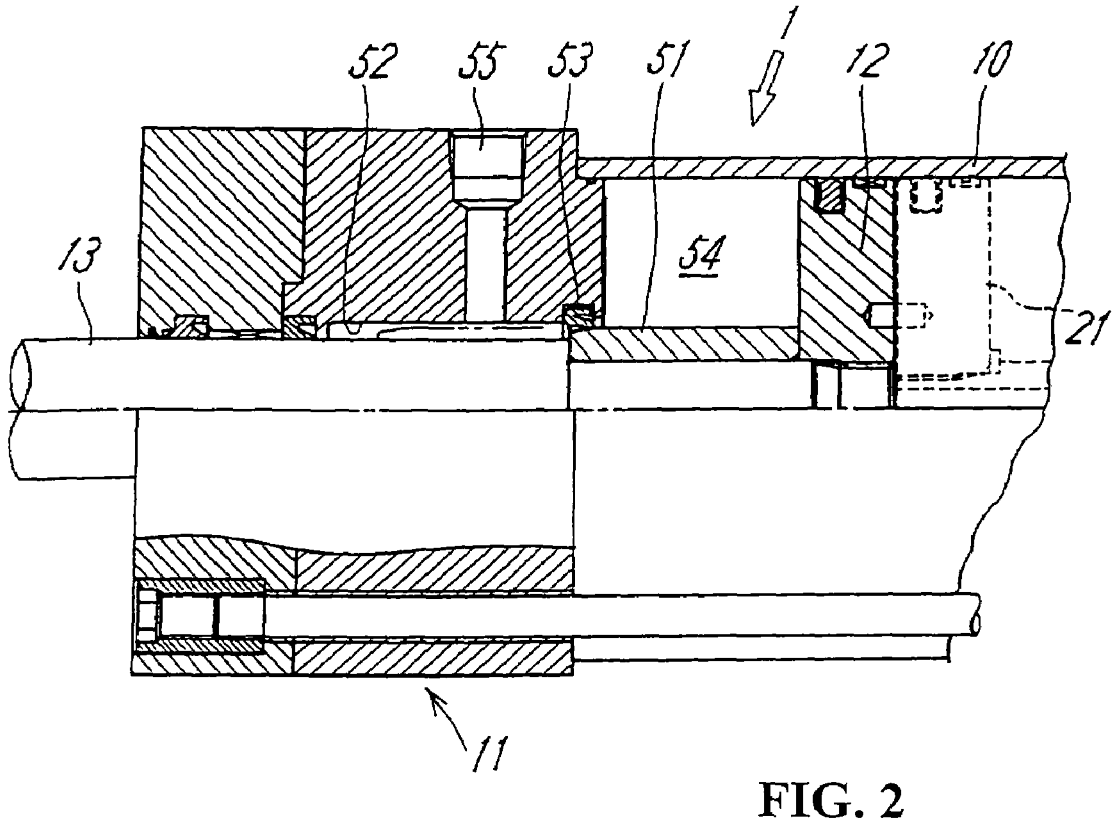
FIG. 2 is an enlarged vertical sectional view of an essential portion (main cylinder) taken in a different direction from FIG. 1 of the first embodiment.

In other words, a cushion ring 51 is provided to the main piston 12, a recessed portion 52 in which the cushion ring 51 is fitted is provided to the rod cover 11, and cushion packing 53 for coming into contact with a peripheral face of the cushion ring 51 to cancel direct connection of the recessed portion 52 and the pressure chamber 54 on a side of the rod cover 11 in the cylinder tube 10 to each other when the cushion ring 51 enters the recessed portion 52 is provided to a mouth edge of the recessed portion 52. As shown in FIG. 2, the recessed portion 52 has a port 55 for supplying compressed air to the pressure chamber 54 for returning the main piston 12 and the cushion packing 53 provides one-way sealing in which the compressed air from the port 55 is all owed to flow into the pressure chamber 54 while a flow of the compressed air from the pressure chamber 54 into the recessed portion 52 is intercepted.

Figure 4:
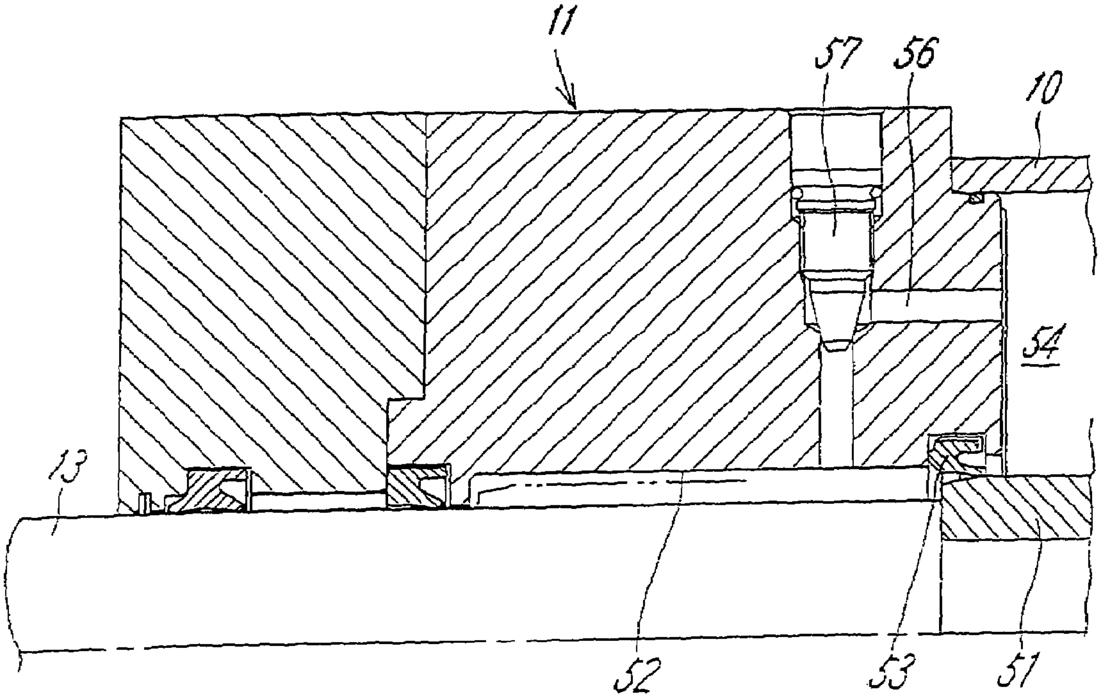
FIG. 4 is an enlarged vertical sectional view of an essential portion (cushioning mechanism) in a different position from FIG. 2 of the first embodiment.

As shown in FIG. 4, a throttle valve 57 for discharging the compressed air in the pressure chamber 54 through the recessed portion 52 to the port 55 in a cushioning stroke of the main piston 12 is provided in a flow path 56 for connecting the pressure chamber 54 and an inner side of the cushion packing 53 in the recessed portion 52. Not only the throttle valve 57 but also a single or a plurality of groove(s) (not shown) on a peripheral face of the cushion ring 51 can be provided between the pressure chamber 54 and the recessed portion 52 to discharge through the groove(s).

On the other hand, a port 59 for supplying compressed air to a pressure chamber 58 on a side opposite to the main piston 12 is provided to an outer end of the auxiliary rod 22 connected to the stop position setting piston 21 and communicates with the pressure chamber 58 through a flow path 60 extending through the auxiliary rod 22.

In this cushioning mechanism, the main piston 12 is driven by supplying the compressed air to the pressure chamber 58. When the cushion ring 51 rushes into the cushion packing 53, a flow path for directly discharging from the exhaust-side pressure chamber 54 through the port 55 is closed. Air remaining in the pressure chamber 54 is discharged only through the flow path 56 provided with the throttle valve 57 or the groove provided to the peripheral face of the cushion ring 51. As a result, pressure in the pressure chamber 54 increases and the pressure exerts a cushioning operation on the main piston 12.

Such a cushioning mechanism is effective on demands such as reduction of wear of a tool such as a welding rod and diminishing of a collision sound which a prior-art cylinder for a pneumatic spot welding gun or the like cannot satisfy.

If there is no necessity of provision of the cushioning mechanism, the main piston 12 does not need to be driven by the compressed air and it is possible to use arbitrary pressure fluid.

As shown in FIG. 1, the rod cover 11 is provided with a stroke detector 63. The stroke detector 63 reads a magnetic scale attached onto the main rod 13 with a head 63*a* to thereby output an electric signal according to a stroke position of the main rod 13 and is connected to a detection controller. Based on the output, the detection controller can detect at which stroke the main rod 13 is operating, based on which not only an operating form of the multistage stroke cylinder but also a wear amount or the like of electrodes can be grasped based on a position of the main rod in pressurization of an object. There is no harm in using a detector for detecting the stroke by other measuring means.

In the cylinder apparatus having the above structure, the main rod 13 is driven basically by supplying pressure fluid such as compressed air to one of the pressure chambers 54 and 58 on opposite sides of the main piston 12 and discharging the compressed air from the other of the pressure chambers at the same time. To put it more concretely, by supplying the compressed air to the pressure chamber 58 of the main cylinder 1 from the port 59 at a tip end of the auxiliary rod 22 through the flow path 60 in the auxiliary rod 22, the main rod 13 is driven in a projecting direction through the main piston 12. By simultaneously discharging the compressed air of the pressure chamber 58 and supplying the compressed air to the other pressure chamber 54, the main piston 12 and the main rod 13 are returned.

The intermediate stop position of the main piston 12 is set by the intermediate stop position setting mechanism 2. In other words, if the compressed air is supplied from the port 28 provided to the head cover 14 to the pressure chamber 27 behind the stop position setting piston 21, the stop position setting piston 21 moves to and stops in a position where the stopper 23 at the tip end of the auxiliary rod 22 connected to the piston 21 comes into contact with the contact portion 31*a* on the outer face of the contact position adjusting piston 31. As a result, the stop position setting piston 21 moves to an intermediate position (a position shown in a chain line in FIGS. 1 and 2) for setting the stop position of the main piston 12.

The intermediate position where the stop position setting piston 21 stops can be adjusted in multiple stages by one or both of the above-described two changing mechanisms, i.e., a mechanism for changing the mounting position of the stopper 23 by selecting the stepped portion 24 of the stopper 23 and a mechanism for changing the contact position of the stopper 23 by the contact position adjusting piston 31. To put it concretely, in the former changing mechanism, the adjustment can be done by detaching the nut 26 and reversing the stopper 23 in the longitudinal direction or by exchanging the stopper 23 for another stopper 23 having stepped portions 24 with different depths. In the latter changing mechanism, the contact position of the stopper 23 can be changed by supplying and discharging the pressure fluid to and from the pressure chamber 36 through the port 35 provided to the supply/discharge block 34 to drive the contact position adjusting piston 31 to thereby displace the contact portion 31*a* to the projecting position or the return position. By combining both the mechanisms, the stop position of the stop position setting piston 21 can be adjusted in multiple stages.

As described above, by changing the intermediate position where the stop position setting piston 21 stops by the changing mechanisms, it is possible to adjust a moving position of the stop position setting piston 21 when the pressure fluid is supplied from the port 28 to the pressure chamber 27 to thereby adjust the return position of the main piston 12.

The return position of the main piston 12, i.e., a full stroke of the main piston 12 is set by the return position setting mechanism 4. To put it concretely, by supplying and discharging the pressure fluid to and from the pressure chamber 47 through the port 46 for setting the return position and provided to the supply/discharge block 34, the return position setting piston 43 and the position setting rod 44 are moved forward or rearward and the tip end of the rod 44 is displaced to two positions, i.e., the projecting position and the return position behind the stop position setting piston 21 to thereby adjust the full stroke of the main cylinder in two stages.

In the cylinder apparatus, because a pressure receiving area of the contact position adjusting piston 31 on a side of the pressure chamber 36 is set to be larger than a pressure receiving area of the stop position setting piston 21 on a side of the pressure chamber 27, the contact position adjusting piston 31 is not pushed back by a force received from the stopper 23 in a state in which the pressure fluid has been supplied from the port 35 to the pressure chamber 36 to drive the contact position adjusting piston 31, the pressure fluid at the same pressure has been supplied from the port 28 to the pressure chamber 27 to drive the stop position setting piston 21, and the stopper 23 has come in contact with the contact portion 31*a* of the contact position adjusting piston 31.

However, in the state in which the pressure fluid has been supplied from the port 28 to the pressure chamber 27 to drive the stop position setting piston 21 and the stopper 23 has come in contact with the contact portion 31*a* of the contact position adjusting piston 31, if the pressure fluid at the same pressure is supplied from the port 59 at the end portion of the auxiliary rod 22 through the flow path 60 in the auxiliary rod 22 to the pressure chamber 58, the stop position setting piston 21 is pushed back by a force from the side of the pressure chamber 58 because the pressure receiving area of the stop position setting piston 21 on the side of the pressure chamber 58 is larger than the pressure receiving area on the side of the pressure chamber 27.

Therefore, the pressure of the fluid supplied from the port 28 is preferably higher to such a degree as not to cause the above-described pushing back than the pressure of the fluid supplied from the port 59 and the pressure of fluid supplied from the port 35 is also preferable to be increased with this increase.

Figure 5:
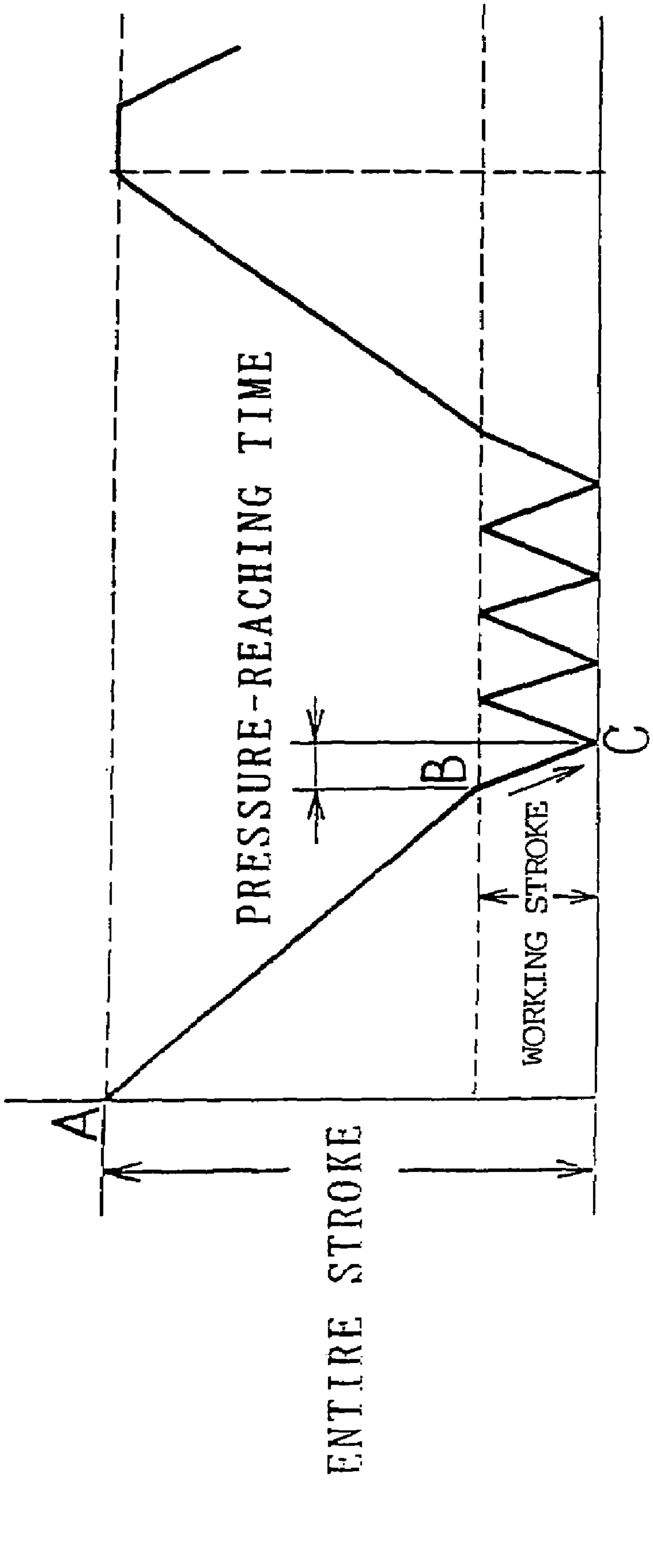
FIG. 5 is an explanatory view for explaining an example of a form of operation of a multistage stroke cylinder according to the invention.

FIG. 5 shows an example of an operating form of the cylinder apparatus. In this example, by supplying the pressure fluid through the port 28 to the pressure chamber 27 from a stroke start position A of the full stroke set by the return position setting piston 43, the stop position setting piston 21 is driven and thus, the main piston 12 is pushed by the stop position setting piston 21 and driven and reaches an intermediate stop position B. Then, by alternately repeating supply and discharge of the pressure fluid to and from the pressure chambers 58 and 54 on opposite sides of the main piston 12, a working stroke of reciprocation between points B and C for multipoint welding or the like is repeated. When this repetition finishes, the pressure fluid in the pressure chamber 27 is discharged from the port 28 in a state in which the pressure fluid has been supplied to the pressure chamber 54 and the main piston 12 is returned to the original stroke start position.

In the above multistage stroke cylinder apparatus of the first embodiment, as described above, degrees of pressures of fluid supplied to the respective ports need to be adjusted in order to carry out necessary operation in connection with a difference between the pressure receiving areas on opposite sides of the stop position setting piston 21. However, in second to fourth embodiments shown in FIGS. 6 to 8, a balance mechanism for eliminating necessity of such pressure adjustment by adjustment or the like of pressure receiving areas of the respective pistons, i.e., a mechanism for setting the stop position of the stop position setting piston when the pressure fluid at the same pressure is supplied to the pressure chambers on the opposite sides of the piston at a position where the piston has moved toward the main piston is attached to the intermediate stop position setting mechanism 2.

Figure 6:
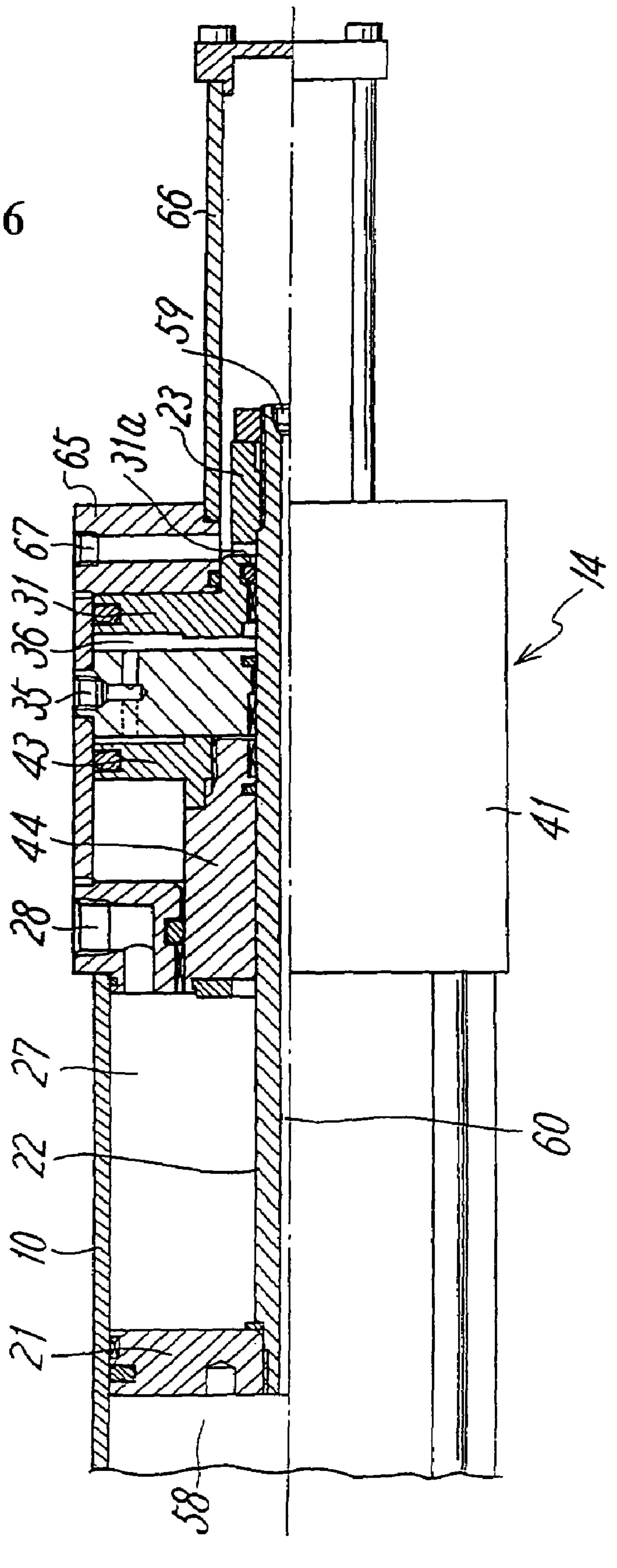
FIG. 6 is a sectional view of an essential portion of a second embodiment in which balance means for eliminating necessity of pressure adjustment of fluid to each supply/discharge port is added to the multistage stroke cylinder of the first embodiment.

First, the second embodiment in FIG. 6 is one in which the above balance mechanism is added to the head cover 14 of the first embodiment. To put it concretely, the head cover 14 is provided with a cylinder-shaped cover 65 having a port 67 instead of the cylinder-shaped cover 32 of the first embodiment and a rod encapsulating tube 66 with which the auxiliary rod 22 is covered in a sealed state is attached to the cylinder-shaped cover 65. The port 67 is connected to the rod encapsulating tube 66 and compressed air is supplied and discharged to and from the pressure chamber 58 from the port 67 through an inside of the encapsulating tube 66 and the port 59 at the tip end of the auxiliary rod 22. Because the rod encapsulating tube 66 is provided, inner and outer peripheries of a shaft-shaped portion forming the contact portion 31*a* in the contact position adjusting piston 31 are sealed with sealing members. Because other structures are not different from those of the first embodiment, they are provided with the same reference numerals as those of the first embodiment.

According to the second embodiment, in a state in which the stop position setting piston 21 has been driven by supplying the pressure fluid from the port 28 to the pressure chamber 27 and the stopper 23 has come in contact with the contact portion 31*a* of the contact position adjusting piston 31, if the pressure fluid at the same pressure is supplied to the pressure chamber 58 from the port 67 through the rod encapsulating tube 66 and the port 59 at the end portion of the auxiliary rod 22, fluid pressure also acts on the end face of the auxiliary rod 22 in the rod encapsulating tube 66. Therefore, fluid pressure operating forces acting on opposite sides of the stop position setting piston 21 and the auxiliary rod 22 become substantially equal to each other. Therefore, the stop position setting piston 21 is not pushed back by the force from the side of the pressure chamber 58.

Figure 7:
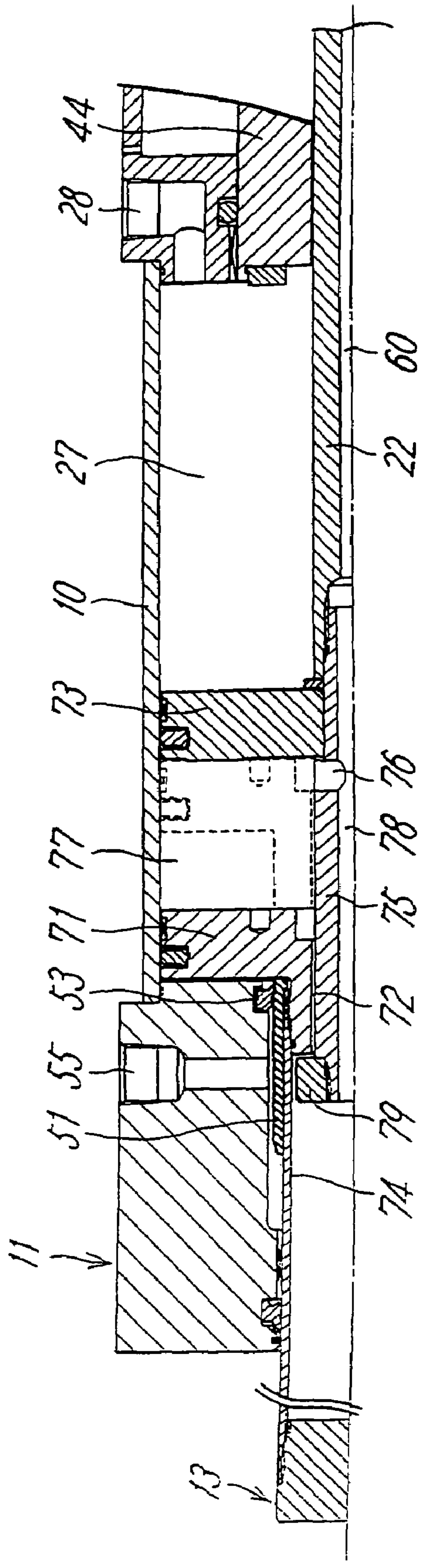
FIG. 7 is a partial half sectional view of a structure of a third embodiment of the multistage stroke cylinder according to the invention.

In the third embodiment in FIG. 7, a projecting lever 75 is provided to a stop position setting piston 73. The projecting lever 75 projects into a pipe 74 forming the main rod 13 through an insertion hole 72 of a main piston 71. The flow path 60 in the auxiliary rod 22 opens into a pressure chamber 77 between the main piston 71 and the stop position setting piston 73 through a hole 76 provided to the projecting lever 75 and opens into the pipe 74 through a through hole 78 in the projecting lever 75. A locking member 79 to be locked to a hole edge of the insertion hole 72 of the main piston 71 is provided to a tip end of the projecting lever 75 projecting into the pipe 74. The projecting lever 75 has substantially the same diameter as the auxiliary rod 22 connected to the stop position setting piston 73 and extending outside on the side of the head cover.

With this structure, in a state in which the pressure fluid has been supplied from the port 28 to the pressure chamber 27, even if the pressure fluid at the same pressure is supplied through the flow path 60 from the hole 76 to the pressure chamber 77 between the stop position setting piston 73 and the main piston 71 and is supplied from the through hole 78 into the pipe 74, because the locking member 79 is locked to the main piston 71, the fluid pressure in the pressure chamber 77 does not act as a force for moving the main piston 71 and the stop position setting piston 73 and the fluid pressure in the pipe 74 only acts as a force for pushing back the stop position setting piston 73. Therefore, the piston 73 is not pushed back.

Figure 8:
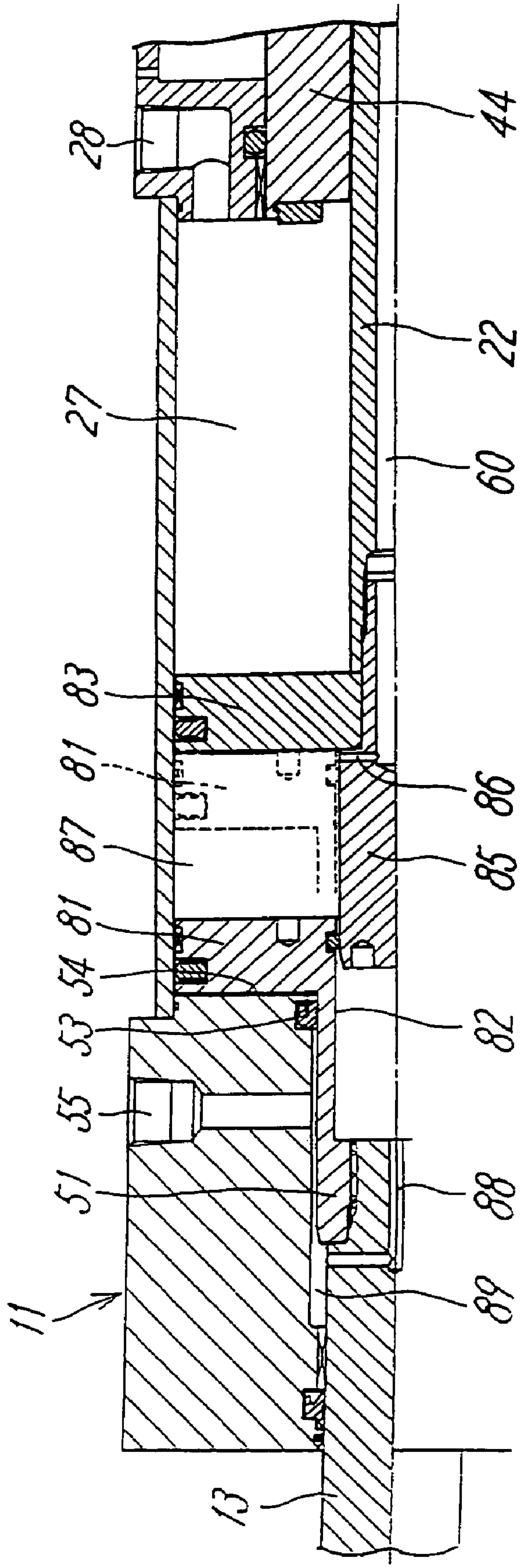
FIG. 8 is a partial half sectional view of a structure of a fourth embodiment of the multistage stroke cylinder according to the invention.

In a fourth embodiment in FIG. 8, a projecting lever 85 is provided to a stop position setting piston 83 and the projecting lever 85 is fitted in a sealed state in opposite directions in an insertion hole 82 provided in a main piston 81. A diameter of the projecting lever 85 is set to be larger than the diameter of the auxiliary rod 22. The flow path 60 in the auxiliary rod 22 opens through a small hole 86 provided to the projecting lever 85 into a pressure chamber 87 between the main piston 81 and the stop position setting piston 83. The insertion hole 82 provided to the main piston 81 is connected through a through hole 88 in the main rod 13 to the port 55 opening into a recessed portion 89 in the rod cover 11.

Because of this structure, in the state in which the pressure fluid is supplied from the port 28 to the pressure chamber 27, even if the pressure fluid at the same pressure is supplied through the flow path 60 to the pressure chamber 87 between the stop position setting piston 83 and the main piston 81 through the small hole 86, the stop position setting piston 83 is not pushed back because the pressure receiving area of the stop position setting piston 83 facing the pressure chamber 87 is smaller than the pressure receiving area facing the other pressure chamber 27.

When the main piston 81 returns, the stop position setting piston 83 is not pushed back by the returning main piston 81. In other words, if the compressed air in the pressure chamber 87 is discharged and the compressed air is supplied from the port 55 through the cushion packing 53 and the like to the return-side pressure chamber 54 at the same time, the main piston 81 returns to a position shown in a chain line and comes in contact with the stop position setting piston 83. At this time, the compressed air also flows into the insertion hole 82 in the main piston 81 through the passage 88. The compressed air acts in the insertion hole 82 in such a direction as to push back the projecting lever 85 while acting on the main piston 81 in such a direction as to move the main piston 81 forward. Therefore, the operating forces cancel each other and, as a result, air pressure operating forces acting on the main piston 81 and the stop position setting piston 83 are obtained from air pressure supplied to the pressure chamber 87 and the pressure chamber 27. Here, because the pressure receiving area of the main piston 81 is smaller than the pressure receiving area of the stop position setting piston 83, the stop position setting piston 83 is not pushed back by the main piston 81.

Because other structures and operations of the third and fourth embodiments are substantially similar to those of the first embodiment, main portions in the drawings are provided with the same reference numerals as those of the first embodiment to omit description of them.

The cylinder apparatus in each the above-described embodiment can be used not only as a gun pressurizing device for a welding assembly line of an automobile body, steel furniture, or the like but also as a cylinder of a pressurizing unit in various clamping devices and other cylinders for various uses in which an intermediate stop is required.

According to the invention described above in detail, it is possible to provide at a low cost a cylinder apparatus with a simple mechanism by which problems of a prior-art fluid pressure cylinder for a spot welding gun or the like are solved. To put it more concretely, the cylinder apparatus has at least two stages of stop positions with respect to an object and a degree of freedom of a stroke is increased to be adaptable to various kinds of members to be welded. As a result, it is possible to obtain the cylinder apparatus less expensive and with better operability than an electric (servo) welding gun.

The invention claimed is:

1. A multistage stroke cylinder apparatus comprising: a main cylinder including a main piston housed for sliding in a cylinder tube and driven by fluid pressure supplied to pressure chambers on opposite sides of said main piston and a main rod connected to said main piston, a head cover and a rod cover being mounted to opposite ends of said cylinder tube; an intermediate stop position setting mechanism for setting an intermediate stop position of said main piston; and a return position setting mechanism for setting a return position of said main piston, wherein said intermediate stop position setting mechanism includes a stop position setting piston disposed for sliding between said main piston in said cylinder tube and said head cover to define said intermediate stop position of said main piston by coming in contact with said main piston, an auxiliary rod connected to said stop position setting piston and having a tip end passing through said head cover and extending outside, a stopper fitted with said tip end of said auxiliary rod to stop said stop position setting piston in a necessary position by coming in contact with a contact portion of said head cover, and a changing mechanism for changing a stop position of said stop position setting piston when said stopper comes in contact with the contact portion, wherein said changing mechanism has a mechanism for changing a mounting position of said stopper on said auxiliary rod, said stopper has a plurality of stepped portions formed on opposite sides of an inner hole of said stopper and having different depths and a stepped portion formed on an outer periphery of said auxiliary rod and is formed to be able to change said mounting position of said stopper on said auxiliary rod by changing an orientation of said stopper to selectively bring any of said stepped portions into contact with said stepped portion of said auxiliary rod, and said return position setting mechanism includes a return position setting piston provided for sliding in said head cover and a position setting rod connected to said return position setting piston and having a tip end projecting so as to directly act on and behind said stop position setting piston.

2. A cylinder apparatus according to claim 1, wherein said auxiliary rod passes for sliding through said return position setting piston and said position setting rod and projects outside said head cover and has a flow path connecting a port for supplying pressure fluid and said pressure chamber on one side of said main piston in said auxiliary rod.

3. A cylinder apparatus according to claim 1, wherein said main cylinder has a cushioning mechanism for reducing a speed of said main piston by restricting a discharge flow rate of fluid discharged from a discharge-side pressure chamber at an end of a stroke of said main piston.

4. A cylinder apparatus according to claim 1, wherein said main cylinder has a stroke detector for outputting an electric signal according to a stroke position of said main rod and said stroke detector is connected to a detection controller for detecting an operating form of said main rod based on said output.

5. A cylinder apparatus according to claim 1, further comprising a balance mechanism for causing said stop position setting piston to stop in a position where said stop position setting piston has moved toward said main piston when pressure fluid at the same pressure is supplied to pressure chambers on opposite sides of said stop position setting piston.

6. A multistage stroke cylinder apparatus comprising: a main cylinder including a main piston housed for sliding in a cylinder tube and driven by fluid pressure supplied to pressure chambers on opposite sides of said main piston and a main rod connected to said main piston, a head cover and a rod cover being mounted to opposite ends of said cylinder tube; an intermediate stop position setting mechanism for setting an intermediate stop position of said main piston; and a return position setting mechanism for setting a return position of said main piston, wherein said intermediate stop position setting mechanism includes a stop position setting piston disposed for sliding between said main piston in said cylinder tube and said head cover to define said intermediate stop position of said main piston by coming in contact with said main piston, an auxiliary rod connected to said stop position setting piston and having a tip end passing through said head cover and extending outside, a stopper fitted with said tip end of said auxiliary rod to stop said stop position setting piston in a necessary position by coming in contact with a contact portion on a side of said head cover, and a changing mechanism for changing a stop position of said stop position setting piston when said stopper comes in contact with the contact portion, said changing mechanism has at least one of a mechanism for changing a mounting position of said stopper on said auxiliary rod and a mechanism for changing a position of said contact portion by a contact position adjusting piston, said mechanism for changing said mounting position of said stopper has a plurality of stepped portions formed on opposite sides of an inner hole of said stopper and having different depths and a stepped portion formed on an outer periphery of said auxiliary rod and is formed to be able to change said mounting position of said stopper on said auxiliary rod by changing an orientation of said stopper to selectively bring any of said stepped portions into contact with said stepped portion of said auxiliary rod, said mechanism for changing said position of said contact portion has said contact position adjusting piston having said contact portion and said adjusting piston is mounted to said head cover and driven by fluid pressure in such directions as to approach and move away from said stopper, and said return position setting mechanism includes a return position setting piston provided for sliding in said head cover and a position setting rod connected to said return position setting piston and having a tip end projecting so as to directly act on and behind said stop position setting piston.

7. A cylinder apparatus according to claim 6, wherein said auxiliary rod passes for sliding through said return position setting piston and said position setting rod and projects outside said head cover and has a flow path connecting a port for supplying pressure fluid and said pressure chamber on one side of said main piston in said auxiliary rod.

8. A cylinder apparatus according to claim 6, wherein said main cylinder has a cushioning mechanism for reducing a speed of said main piston by restricting a discharge flow rate of fluid discharged from a discharge-side pressure chamber at an end of a stroke of said main piston.

9. A cylinder apparatus according to claim 6, wherein said main cylinder has a stroke detector for outputting an electric signal according to a stroke position of said main rod and said stroke detector is connected to a detection controller for detecting an operating form of said main rod based on said output.

10. A cylinder apparatus according to claim 6, further comprising a balance mechanism for causing said stop position setting piston to stop in a position where said stop position setting piston has moved toward said main piston when pressure fluid at the same pressure is supplied to pressure chambers on opposite sides of said stop position setting piston.

* * * * *